Figure 1:
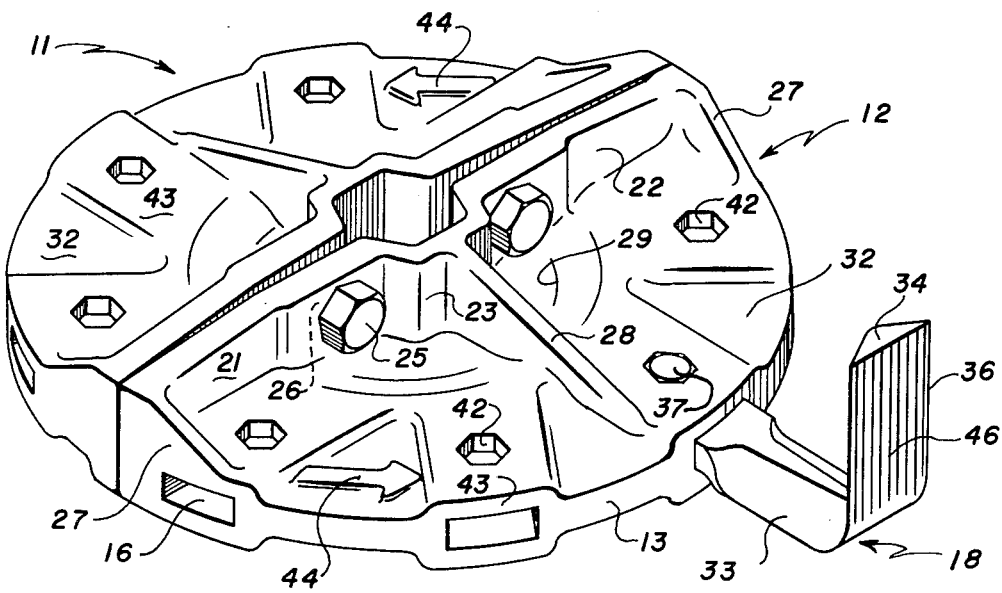

Aug. 10, 1965   M. R. ROBINSON   3,199,609
HUB AND MOUNTING MEANS FOR A CULTIVATING TOOL
Original Filed March 28, 1960

INVENTOR.
Mayes R. Robinson
BY Paul Bliven

United States Patent Office 3,199,609
Patented Aug. 10, 1965

3,199,609
HUB AND MOUNTING MEANS FOR A
CULTIVATING TOOL
Mayes R. Robinson, Gilroy, Calif.
(P.O. Box 45, San Martin, Calif.)
Original application Mar. 28, 1960, Ser. No. 18,077, now Patent No. 3,101,122, dated Aug. 20, 1963. Divided and this application Sept. 24, 1962, Ser. No. 225,711
2 Claims. (Cl. 172—556)

The present invention relates to a rotary tool holder for use with ground cultivators and is a division of application Serial No. 18,077, filed Mar. 28, 1960, now Patent No. 3,101,122. In more particular the tool holder of the present invention relates to the construction of split discs that are adapted to have their two semicircular parts bolted together on a polygonal drive shaft, and, each of which discs, to have formed therein a plurality of sockets for the reception and retention in each of a portion of the shank of a ground engaging and working tool.

There are in the prior art tool holders of such a general construction but they have been unsatisfactory for several reasons. The tool sockets and the main parts of the discs have been frequently subject to breakage. It has been difficult to keep them secure on the drive shaft on which they are mounted. Further, the action of the tools carried by the discs of the prior art has not been satisfactory by comparison with that of tools carried by the discs of the present invention because of the orientation of the tool sockets of the discs with respect to the discs.

Thus, it is an object of the present invention to devise for cultivators a rotatable disc tool holder which clamps securely to and remains secured to a polygonal drive shaft.

A further object of the present invention is the locating of the tools with respect to the disc so that the tools will have a better action in the soil than those of the prior art when the disc and tools of the present invention are rotated in and travel thru the soil. The present tools do not pack the soil at the bottom, or sole, of their cut.

Another object of the invention is the locating of the tool sockets so that for the same weight of material the disc will be stronger than the discs of the prior art insofar as breaking of the socket walls is concerned.

The above mentioned defects of the prior art devices are remedied and these and other objects achieved by the construction of a tool holder disc out of a light weight material, such as an aluminum alloy, in two semicircular parts that bolt together to fit a polygonal shaft. The opposed diametral faces of the semicircular parts, are arched, or relieved, to provide a lenticular space therebetween with such parts only in contact at their peripheries. The diametral faces are flanged on only one side of the disc, and a clamping bolt passes thru the opposed flanges on each side of and about a third of the radius from the periphery of the disc.

This placing of the bolts and the spacing of the flanges allows the flanges and the disc, to a much lesser degree, to flex when the disc is on a shaft and the clamping bolts are tightened. This flexing of the flanges keeps tension on the bolts so that they do not loosen in service, and so that the disc halves remain secured to and in place on the drive shaft upon which they are mounted.

Further, the tool sockets are located medially of the web of the disc and have equal wall thicknesses on the sides thereof parallel to the plane of the web, to greatly reduce breaking of the tool sockets. Also, the axis of each socket is placed parallel to a radius of the disc and offset thereto an inch or two to give clearance to the cutting blade of the tool carried by each socket, to thereby greatly reduce the power required for working of the soil and to reduce packing of the soil by the action of the tool.

Figure 2:
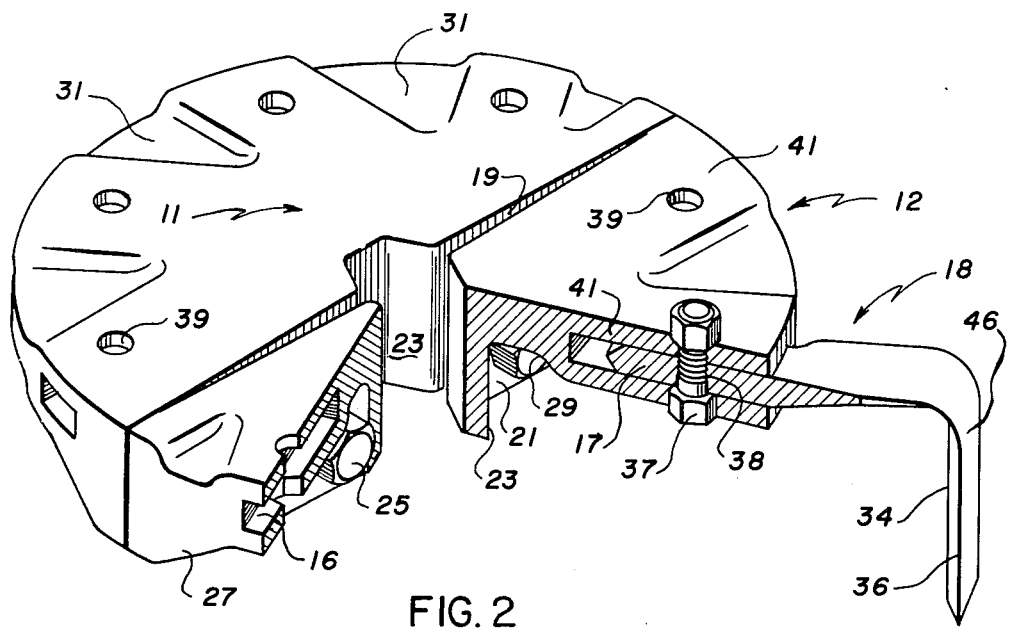

A cultivator tool holder such as briefly described above is hereinafter described in detail and illustrated in the accompanying drawings, in which:

FIGURE 1 is a perspective view of the front face of a tool holder disc and one tool secured thereto and therein; and FIGURE 2 is a perspective view of the back face of the tool holder of FIGURE 1, with a portion cut away.

The illustrated tool holder disc is formed in two semicircular parts, or halves, 11, 12 which are identical to each other. Each half may be considered to have a semicircular web 13 in which are formed sockets 16 for the reception in each of a rectangular shank end portion 17 of a tool 18. On the front face of and normal to the web is a series of flanges. Edges of the two halves of the disc are opposed to each other along a diameter of the disc, and each edge is relieved so that there is formed a lenticular opening 19 between and by such opposed edges, and recessed for a shaft. Such halves are only in contact at and adjacent the disc periphery, the ends of the lenticular opening. Each such opposed edge has therealong such a flange which is normal to the web and only on one face thereof. This flange may be called the meeting flange, or the opposed flange, and is considered as divided into three sections, two radial sections 21, 22 separated centrally of the edge by a three-sided section 23 forming, with the web recess, a recess in the edge, or part, and in the flange which is adapted to fit against three sides of a hexagonal shaft.

The three sided recess 23 of the two halves 11, 12 of the disc are thus formed to, in opposition, fit such a shaft, and are clamped in such position by means of two bolts 25, one on each side of such shaft and passing thru an opening 26 in each such radial section 21, 22 of the opposed flanges of the halves 11, 12. The bolt holes 26 are spaced apart a distance about a third of the diameter of the disc, and about the middle of the flange from the web. The opposed flanges are widest at the three-sided sections 23 and taper slightly to the periphery where the end of each radial section 21, 22 joins to a short peripheral gusset 27. These gussets take much of the clamping force on the opposed flanges, and the forces between the halves of the disc as it is at the periphery that the halves are in contact. Further, the three-sided sections 23 and the flanges there adjacent are thicker than the flange sections 21, 22 adjacent the periphery and the gussets 27. This gives metal mass contiguous the shaft to resist torque and impact between shaft and disc.

Extending from the outer side of the middle of the three-sided flange section 23 of each disc half is another flange, or rib 28, that tapers into the web adjacent the disc periphery. It will be observed that with this system of flanges 21, 22 and ribs 28, each of the three sides of the three-sided flange section 23 is buttressed against forces that may be exerted there-against by a hexagonal shaft. Adjacent each head and nut of the bolts 25 there is an annular recess 29 which provides wrench clearance for such heads and nuts.

The web has its portions between the sockets, formed by the back 31 and front 32 depressions, thinner than its portions at the sockets, measured from front to back face. The back face is flat except for these small triangular depressions 31 between the adjacent socket side walls. Having all the ribs and flanges on only one side of the tool holder disc makes it easier to mold and cast the disc halves as compared to having ribs and flanges on both faces.

Each of the tools 18 is formed from a length of bar stock which is forged and tempered so that each is in the form of an angle having a shank which is divided into two parts, the rectangular insertive part 17 and a free, or cutting, part 33; and a head 34 at right angles to the shank. The cutting part of the shank and the head have the same cross sectional form of a symmetrical trapezoid. The acute angles of the trapezoid form cutting edges 36. In use, when one cutting edge becomes dull, the tool may be reversed so as to use the other cutting edge. Each tool is retained in its socket by a tool bolt 37 that passes thru a round hole 38 in the tool shank and a round hole 39 in the back side 41 of the socket with the head of the bolt secured against turning in a hexagonal opening 42 in the front side 43 of the socket. The bolt nut is tightened against the back face of the socket's back side 41. Forming the socket side with an opening to retain the bolt head against turning, aids in keeping the nut tight on the bolt and enables the nut to be tightened with a single wrench.

The disc is provided with eight sockets peripherally evenly spaced, four to a disc half, and each of the sockets 16 for the reception of a tool shank is rectangular in cross section with the sides 41, 43 thereof parallel to the plane of the web 13 and the edges thereof centered in the web, and with the material on each side of the socket being of the same thickness. Thus the web side walls are symmetrical with respect to the web.

It is to be observed that the axis of each of the sockets, which axis is coincident with the longitudinal axis of a tool shank when such is inserted in a socket, is parallel to and offset from a radius of the disc and forward of such radius in the direction of rotation of the disc as indicated by the arrows 44 cast in the front face of the webs, as such relationship is an important part of the present invention, a relationship which materially enhances the operation of the device. For a disc having a ten inch diameter, this offset is about an inch and a quarter. Each of the tools 18, of which only one is shown, has a tool head outer face 46 that is normal to the shank axis; and this face is at an angle of 85° to 90° with respect to a radius of such disc thru the center of such face, measured in the plane of the disc. This angle range remains constant regardless of the diameter of the disc. That is, the parallel offset between radius and shank axis is increased with an increase in disc diameter. The length of the tool shank may be varied, and may be long for deep cultivation. In use, the disc and its tools are rotated with the plane of the disc normal to the general ground surface and rotated to move the tools thru the ground in the direction of such rotation, irrespective of the direction of travel of the machine carrying such disc.

Setting and rotating the tools as above described, causes each tool to scrape and lift the ground, as the tool face 46 is at an angle to its leading edge's tangential direction of travel and inside the circle of rotation of such edge. If such tool face were normal to a disc radius, and if the rotational movement of the tool thru the ground has a component in the direction of translational movement of the disc, a common mode of operation, then such tool face would press against the ground as and after the tool begins to rise thru the ground from its deepest position therein. This pressing of the outer tool faces 46 on the ground may double the power requirements for rotational and translational movement; and results in a packing of the soil in the zone below the depth of tool penetration, a packing at and below the sole of the tool cut.

Having thus described my invention, its construction and operation, I claim:

1. A ground cultivator tool holder disc having formed therein an even numbered plurality of rectangular tool sockets equally spaced peripherally thereof, each of said sockets having the side walls thereof opposed axially of said disc and of equal thickness, each of said sockets having its axis parallel to and offset from a radius of said disc, said disc being formed with a polygonal sided axial shaft opening, the number of sides of said shaft opening and the number of tool sockets, one with respect to the other, not being a whole number, and said disc being divided into two semicircular parts formed to have therebetween a lenticular opening extending diametrically of said disc and formed so that contact between said parts is limited to peripheral portions thereof; and means for securing together said semicircular parts; and secured in each of such sockets the shank of a ground engaging tool, each of said tools being in the form of a flat bar bent out of the plane of a side thereof so that there are outer and inner faces thereof with a portion to one side of such bend being a straight rectangular shank of a size to conform to a such socket and to extend beyond the periphery of such disc, and the portion to the other side of said bend being a head formed with opposite cutting edges joined by the outer face of said head, said face and edges being substantially normal to the faces of said shank, and said edges being continuous of said head, said bend, and substantially the shank extension beyond said periphery; and a single bolt securing said shank in said socket.

2. The combination of a ground cultivator tool holding disc and a plurality of angle shaped ground engaging tools; such disc having formed therein a plurality of similar, rectangular, and relatively flat sockets equally spaced peripherally of such disc, and each such socket having its width parallel to the plane of such disc and its axis substantially parallel to and offset from a radius of such disc; each of said tools being in the form of a flat bar bent out of the plane of a side thereof so that there are outer and inner faces thereof with a portion to one side of such bend being a straight rectangular shank of a size to conform to a such socket and to extend beyond the periphery of such disc, and the portion to the other side of said bend being a head formed with opposite cutting edges joined by the outer face of said head, said face and edges being substantially normal to the faces of said shank, and said edges being continuous of said head, said bend, and substantially the shank extension beyond said periphery; and a single bolt securing said shank in said socket.

References Cited by the Examiner

UNITED STATES PATENTS

| | | | |
|---|---|---|---|
| 1,414,364 | 5/22 | Koszegi | 172—556 |
| 1,896,391 | 2/33 | Chong et al. | 172—556 |
| 2,140,871 | 12/38 | Hart | 172—556 X |
| 2,438,707 | 3/48 | Kropp | 172—556 X |
| 2,501,364 | 3/50 | Traver | 172—556 X |
| 2,559,996 | 7/51 | Pettman | 172—556 |
| 2,597,742 | 5/51 | Mahoney | 172—556 |
| 2,732,785 | 1/56 | Kleppe | 172—556 |
| 2,754,744 | 7/56 | Hall | 172—556 |
| 2,802,408 | 8/57 | Seaman | 172—556 X |
| 3,032,121 | 5/62 | Carter | 172—556 X |
| 3,101,122 | 8/63 | Robinson | 172—556 |

ANTONIO F. GUIDA, *Acting Primary Examiner.*

A. JOSEPH GOLDBERG, ARNOLD RUEGG,
*Examiners.*